H. V. ADAM.
AUTOMATIC WEIGHING MACHINE.
APPLICATION FILED MAR. 3, 1921.

1,416,312.

Patented May 16, 1922.

Inventor
Henry Vincent Adam

UNITED STATES PATENT OFFICE.

HENRI VINCENT ADAM, OF DJOCJA, JAVA.

AUTOMATIC WEIGHING MACHINE.

1,416,312. Specification of Letters Patent. Patented May 16, 1922.

Application filed March 3, 1921. Serial No. 449,535.

*To all whom it may concern:*

Be it known that I, HENRI VINCENT ADAM, a subject of the Queen of the Netherlands, and residing at Djocja, Java, have invented certain new and useful Improvements in Automatic Weighing Machines, (for which I have applied for patent in Holland, July 28, 1914; Germany, December 14, 1915; England, December 16, 1915; Holland, May 11, 1917; Germany, October 9, 1917; Germany, October 15, 1917; England, October 18, 1917; Denmark, January 26, 1918; Sweden, January 28, 1918; Switzerland, February 9, 1918; Austria, February 18, 1918; Norway, February 27, 1918; Hungary, March 1, 1918; Belgium, March 30, 1918; Spain, April 10, 1918; Brazil, April 17, 1918; Argentine, April 18, 1918; Australia, April 23, 1918; New Zealand, April 29, 1918; South Africa, May 6, 1918; Trinidad, May 1, 1918; Peru, May 7, 1918; Italy, May 10, 1918; Portugal, May 29, 1918; Finland, July 10, 1918; Egypt, July 25, 1918; France, August 31, 1918; Chile, September 21, 1918; Ceylon, October 13, 1918; New Zealand, October 29, 1918; Cuba, November 16, 1918; Ceylon, December 16, 1918; Mexico, in 1918; Hongkong, in 1918; Straits Settlements, in 1918; and Barbados, in 1918,) of which the following is a specification.

This invention relates to automatic weighing apparatus especially for liquids, having two tiltably mounted weighing troughs which are alternately filled and discharged.

The weighing apparatus according to the invention is of the above type and is primarily characterized in this that each trough is provided with two pawls or the like which are electromagnetically controlled by the weighing apparatus by means of contact members, one pawl being adapted to hold the respective trough in the filling position, while the other pawl holds it in the discharge position. A further object of the invention is to allow the trough to return into its upright position exactly in the moment wherein the desired tare weight has been attained after discharge of the liquid. A still further object of the invention is to avoid shocks owing to the sudden discharge of the liquid when the trough is tilted.

Figure 1:
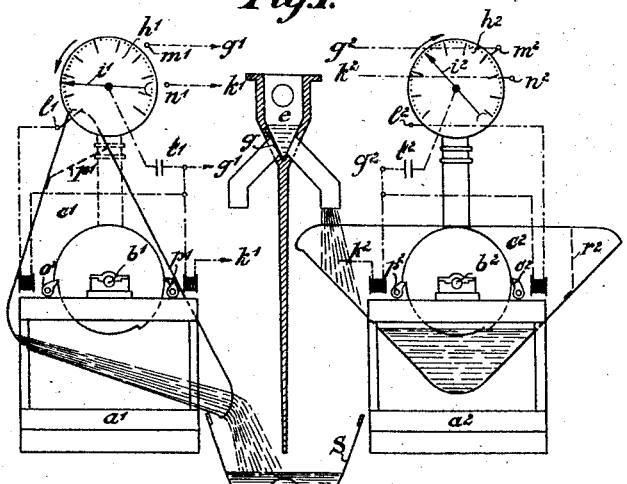

The accompanying drawings show one embodiment of the invention by way of example, the electrical devices being indicated diagrammatically:

Figure 1 shows an elevation of the weighing apparatus and

Figures 2, 3, 4:
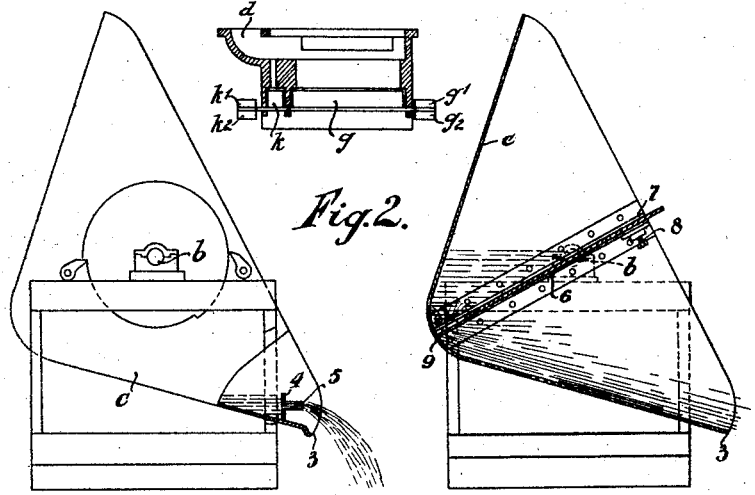

Figure 2 a sectional view of the device provided for regulating the liquid feed;

Figure 3 shows a device having for its object to allow the trough to reassume its upright position exactly in the moment wherein the desired tare weight has been attained after discharge of the liquid, and Figure 4 illustrates a device having for its object to avoid shocks owing to the sudden discharge of the liquid when the trough is tilted.

For carrying the invention into effect two duplicate apparatus are used which co-operate with other devices common to both. One of the said apparatus will now be described and the various parts such as $a^1$, $b^1$, and so forth in the one apparatus are duplicated in the other apparatus and indicated by $a^2$, $b^2$, and so on.

A weighing trough $c^1$ is fixed by means of journals $b^1$, on the platforms $a^1$ of an ordinary weighing machine. The liquid to be weighed is fed into the respective troughs by the feed tube $d$ and the valve casing $e$ containing a large flap valve $g$ and a small flap valve $k$ (Figure 2). According to the position of the flap valves the liquid is fed to one trough or the other.

The dial $h^1$ is preferably provided with a scale with which the pointer $i^1$ co-acts in order to indicate the weight of the liquid contained in the trough and is provided with three contacts $l^1$, $m^1$, $n^1$, arranged to co-act with the pointer in such way that $l^1$ indicates the weight of the liquid remaining as tare weight in the trough after each discharge of the latter, while $n^1$ corresponds to the sum of net and tare weights, $m^1$ being arranged at some distance before $n^1$.

Each weighing trough is provided with a disc having two projections or shoulders, the pawls $o^1$ and $p^1$ being arranged to co-act with the latter. The weighing trough is kept in its tipped position by the pawl $o^1$ and in its upright position by the pawl $p^1$.

The shape and the dimensions of the trough are such that when it is empty it has a tendency to assume the position for being filled while when once filled it has a tendency to tip towards the receiving trough. This effect may be realized in a simple manner by providing a liquidtight partition wall $r^1$. The lateral displacement of the trough, until the right moment, is prevented by the pawls $o^1$ and $p^1$.

The electric connections of the contacts are such that $l^1$ forms part of a circuit comprising the magnet coil actuating the pawl $o^1$, while $n^1$ is connected with the circuit comprising the magnet coil actuating the pawl $p^1$.

In order to regulate the liquid feed in accordance with the tipping motion of the weighing troughs each of the flap valves $g$ and $k$ can be actuated by a couple of magnets $g^1$, $g^2$, and $k^1$, $k^2$, diagrammatically indicated in Figure 2.

The magnet $g^1$, actuates the flap valve $g$ in such a way that the latter is swung to the left (Figure 1) when the magnet coil current is closed. The magnet $k^1$ actuates the flap valve $k$ in a corresponding manner, while $g^2$ and $k^2$ are arranged to actuate the flap valves in the opposite sence.

The magnet $k^1$ forms part of a circuit comprising the contact $n^1$ and the magnet for actuating the pawl $p^1$, while the magnet $g^1$ forms part of a circuit comprising the contact $m^1$. In the same way the magnet $k^2$ forms part of a circuit comprising the contact $n^2$ and the magnet for actuating the pawl $p^2$, while the magnet $g^2$ forms part of a circuit comprising the contact $m^2$. The current required for energizing the magnet coils is supplied by the sources of current $t^1$ and $t^2$.

The apparatus works as follows:—

When the trough $c^2$ is filled and the trough $c^1$ discharged into the receiving trough according to Figure 1, the pointer $i^1$ sinks while $i^2$ rises. As soon as $i^1$ touches the contact $l^1$ the magnet corresponding with pawl $o^1$ is energized and the pawl removed, the trough $c^1$ consequently assuming its upright position in which it is secured by the pawl $p^1$. After that the pointer $i^2$ touches the contact $m^2$ thus causing the coil of the magnet $g^2$ to be energized; the large flap valve $g$ is consequently swung to the right (Figure 1) into the position $g^3$ so that the main flow of the liquid is directed to the trough $c^1$. Meanwhile the small flap valve $k$ allows a feeble flow of liquid to pass to the trough $c^2$ thus causing the pointer $i^2$ to advance slowly towards the contact $n^2$ and finally close the circuit energizing the magnet $k^2$ so that the small flap valve is also swung to the right; the magnet corresponding with the pawl $p^2$ is energized at the same moment causing the trough $c^2$ to tip and discharge its contents into the receiving trough. The pointer $i^2$ sinks again while $i^1$ rises, the described process being repeated inversely with regard to the troughs.

It will be clear that a continuous and automatic weighing process is obtained in this way.

It is obvious that instead of the pointer $i^1$ any other member moving owing to an increase or a decrease of the weight of the trough may be used for closing or breaking the electric circuits for controlling the said pawls, and that the invention is not limited to weighing apparatus of the type described but that it may also be employed in combination with apparatus wherein a plurality of weights are provided for successively loading a lever as the weight of the load increases, such as is described in the German patent specification No. 121,964 cl. 42–d.

The purpose of arranging the small flap valve $k$ in addition to the large valve $g$ is to regulate the completion of the weighing to a nicety after the trough has quickly been filled; it will however be understood that it is also important that the desired tare weight be exactly attained after the trough has quickly been discharged. Now according to the present invention, the rate of discharge of liquid from the trough is reduced some time before the weight of the trough with its contents has fallen to the desired total tare weight. From this moment the liquid still contained in the trough flows out in a thin stream, which favorably affects the exactness of the weighing operation, so that only with this improvement the weighing apparatus may fully answer the requirements.

Figure 3 represents a side elevation, partly in section, of a weighing trough in its discharge position provided with the new arrangement. $c$ is the trough, which is pivotally mounted on trunnions $b$, and from which the liquid may be discharged over the outflow or mouth 3. At a certain distance from the mouth 3, a ridge 4 is secured to the inner wall of the trough, the said ridge extending through the whole length of the trough and being pierced by a comparatively narrow discharge pipe 5. The arrangement is such that if the filled trough is tilted the liquid contained therein is at first free to flow over the ridge 4 and out at the mouth 3; a certain quantity of liquid however, exceeding that which should remain in the trough to form the extra tare, is withheld by the ridge 4 in the discharge position of the trough. The latter quantity must be discharged through the narrow pipe 5, so that at last the weight of the trough with its contents is reduced so gradually that the trough can return into its filling position just in the moment wherein the desired total tare weight has been attained. The quantity of liquid discharged through the narrow pipe 5 during the erection of the trough may safely be neglected, so that the result of the weighing operation may be held to be absolutely correct.

If desired the ridge 4 on the inner wall of the trough might be provided with a plurality of narrow discharge pipes, or simply with one or a plurality of discharge holes. Neither is it necessary for the ridge to extend to the side walls of the trough.

A further objectionable feature of weighing apparatus with tiltably mounted troughs is the fact that when the filled trough is tilted, the liquid contained therein flows out with considerable velocity, whereby the weighing apparatus proper is liable to damage owing to the shock produced by the sudden discharge, and the correct indication of the weight is interfered with. This objectionable feature might be avoided, for instance, by the provision of mechanical means, but this would entail a serious complication of the apparatus.

According to the present invention the object aimed at can be realized in a simple and efficient manner by subdividing the troughs by means of one or more preferably adjustable partitions into two or more compartments which are in communication with each other through a comparatively narrow passage near the bottom.

Fig. 4 illustrates, by way of example only a crosssectional elevation of a weighing trough in its tilted position, provided with the new arrangement.

$c$ is the trough which is pivotally mounted on trunnions $b$ the outflow or mouth being designated by 3. Now, according to the present invention, a partition 6 is provided in said trough in such a manner that it is substantially vertical when the latter assumes its upright position, the said partition being adapted to be raised and lowered whereby it is guided in grooves 7, it being secured in any desired position by means of a bolt 8. Between the lower edge of the partition 7 and the bottom of the trough $c$, a comparatively narrow opening 9 is left which may be regulated by raising or lowering the partition 6.

When the trough $c$, after being filled in its upright position, is tilted, the liquid in the compartment opposite the mouth 3 will be prevented from suddenly flowing out of said compartment owing to the restricted dimensions of the opening 9, so that it will prevent a sudden and excessive displacement of the centre of gravity towards the overflow edge 3. By properly adjusting the size of the passage 9 in connection with the viscosity of the liquid, the entire movement of the trough will take place very smoothly and gradually and shocks will be absolutely avoided.

Although I have described and claimed my invention in respect of an apparatus having two weighing troughs it is to be understood that it is equally applicable to, and the claims are intended to cover, a weighing apparatus having two sets of tiltably mounted weighing troughs, one set of troughs being filled while the other set is discharging.

The apparatus may also be adapted for weighing substances of a pulverulent or granular nature by slightly modifying the construction of the feed regulating device.

Having now particularly described and ascertained the nature of my said invention and in what manner the same is to be performed, I declare that what I claim is:—

1. An automatic weighing apparatus including two tiltably mounted weighing troughs adapted to be alternately filled and discharged, weighing means operatively associated with each trough, two locking members for each trough, one locking member functioning to hold a trough in upright position and the other locking member functioning to hold the trough in tilted position, electro-magnetic means for actuating said locking members, electric circuits in which the electro-magnetic means are arranged, and contacts for the electric circuits actuated by the weighing means for causing the unlocking of one of said locking members when a predetermined quantity of material has been placed in a trough and for unlocking the other locking member after a predetermined quantity of the material has been discharged from a trough.

2. In weighting apparatus as claimed in claim 1, means for withholding in the weighing trough a certain quantity of liquid after the main portion of the liquid has been freely discharged over the overflow edge in the discharge position of the trough, and allowing only a comparatively slow discharge of said quantity of liquid, substantially as described.

3. In weighing apparatus as claimed in claim 2, the provision on the inner wall of each of the weighing troughs of a ridge with a comparatively narrow discharge opening, substantially as described.

4. In weighing apparatus as claimed in claim 1, the provision in the troughs of partitions to form a plurality of compartments in each trough in communication with each other through a comparatively narrow opening near the bottom of the trough, substantially as described.

5. In weighing apparatus as claimed in claim 2, the provision in the troughs of partitions to form a plurality of compartments in each trough in communication with each other through a comparatively narrow opening near the bottom of the trough.

6. In weighing apparatus as claimed in claim 3, the provision in the troughs of partitions to form a plurality of compartments in each trough in communication with each other through a comparatively narrow opening near the bottom of the trough.

7. In a weighing apparatus, a plurality of tiltably mounted weighing troughs adapted to be alternately filled and discharged, weighing means operatively associated with each of said troughs, a plurality of locking members for holding each trough in upright or tilted position, and means actuated by the weighing means for operating said locking members to release one of said locking members when a trough contains a predetermined quantity of the material being measured and to actuate another locking member to permit a trough to return to its upright position after it has discharged its contents.

8. An automatic weighing apparatus including two weight scales, a tiltably mounted trough carried by each weight scale, two locking members for each trough, one locking member being adapted to secure the trough in upright position and the other locking member functioning to hold the trough in tilted position, a discharge container arranged between the troughs and adapted to receive material discharged from the troughs, a supply reservoir having a discharge conduit for each trough, a valve for controlling the passage of material through said conduits, electro-magnets for actuating said locking members, other electro-magnets for actuating said valve, electric circuits in which said magnets are arranged, and electric contacts connected with said circuits and actuated by the weighing scales for causing movement of said locking members and said valve.

Dated this 10th day of February 1921.

In testimony whereof I affix my signature.

HENRI VINCENT ADAM.